(12) United States Patent
Thompson et al.

(10) Patent No.: US 6,932,109 B2
(45) Date of Patent: Aug. 23, 2005

(54) SCAVENGER VALVE ASSEMBLY

(76) Inventors: Gene M. Thompson, 13459 Pine Dr., Cypress, TX (US) 77429; Edgar G. Beidler, 15318 Palton Springs Dr., Houston, TX (US) 77082

( * ) Notice: Subject to any disclaimer, the term of this patent is extended or adjusted under 35 U.S.C. 154(b) by 0 days.

(21) Appl. No.: 10/206,626

(22) Filed: Jul. 26, 2002

(65) Prior Publication Data

US 2004/0016459 A1 Jan. 29, 2004

(51) Int. Cl.$^7$ .............................................. F16K 15/06
(52) U.S. Cl. ............... 137/512.1; 137/269; 137/315.27; 137/543.17; 137/454.4
(58) Field of Search .................. 137/269, 271, 137/512.1, 533.19, 543.17, 315.27, 454.4, 601.2

(56) References Cited

U.S. PATENT DOCUMENTS

| 769,707 | A | * | 9/1904 | Miller ..................... 137/454.4 |
| 3,035,599 | A | * | 5/1962 | Loss ......................... 137/240 |
| 3,124,152 | A | * | 3/1964 | Payne ..................... 137/269.5 |
| 3,602,247 | A | * | 8/1971 | Bunn et al. ................ 137/270 |
| 4,489,752 | A | * | 12/1984 | Deminski ............... 137/512.1 |
| 4,872,481 | A | * | 10/1989 | Shaw et al. ............. 137/543.17 |
| 6,581,632 | B2 | * | 6/2003 | Walpole et al. .......... 137/512.1 |

* cited by examiner

Primary Examiner—Ramesh Krishnamurthy
(74) Attorney, Agent, or Firm—Mark A. Tidwell; Jackson Walker L.L.P.

(57) ABSTRACT

A poppet scavenger valve includes multiple cages for multiple poppets, permitting better control of the spacing of the assembly, facilitating maintenance and permitting better fluid flow through the cage structure. A spacer or lift plate may be positioned between the cage and the seat for defining a flow control device for accurately setting and controlling the valve flow. Each cage component is mounted on the lift plate and is trapped between the plate and the seat. Alignment pins are provided to assure proper alignment between the cylinders and the mated counter bores in the cages. The stroke, or valve flow, can be controlled by adjusting the height of the lift plate, without any alteration to or modification of the cage. Multiple cage configurations are possible, including cages for supporting any array of poppets from a grid to a longitudinal assembly. Each cage is adapted for supporting any multiple of poppets, including single poppet cage systems where applicable. Each of the plurality of cages in the valve system may be customized to provide clearance for external components and for other uses, as necessary.

22 Claims, 6 Drawing Sheets

Spacer Plate

SCAVENGER VALVE ASSEMBLY

BACKGROUND OF THE INVENTION

1. Field of the Invention

The present invention is directed to a multiple element poppet valve arrangement, particularly for use with gas compressors, and more specifically to a scavenger valve having multiple cage elements for multiple poppets.

2. Discussion of the Prior Art

The use of single or multiple deck multi-element valves in gas transmission compressors and the like is well known. In conventional installations, the reed or strip valve is formed by a plate-like seat having a number of spaced slots communicating with an inlet port which mates with a plate-like cage or stop, having recess which communicates with an outlet port. The slots and recesses are so arranged that they will be aligned to form a valve chamber when the cage and seat, respectively, are mated together, with the periphery of the seat area and the complementary cage area for forming a seating surface.

One common type of valve is a poppet valve having a reciprocating gating element mounted within each valve chamber. Conventionally, the poppet is mushroom-shaped and typically includes a hollow stem slidable within a counter recess in the cage bore which serves to guide the poppet during its reciprocating travel. The opposite end of the poppet is typically of a convex arcuate shape configured to form a seal with the valve seat when the valve is closed. A coil spring is usually located within the hollow valve stem and serves to bias the poppet toward the seat and toward a valve closed position.

In many such applications, the poppet valve is a scavenger valve, where intake air or gas enter the flow path through the cage or stop when the valve is closed or moving towards the closed position and positive flow passes through the valve chamber when the valve is open or moving towards the open position.

Valve assemblies using poppets movable alternately, into, and out of, engagement with the exit of a gas port for controlling flow are well known in the art. See e.g. U.S. Pat. Nos. 4,228,820; 4,489,752; 4,872,481 and 5,190,446. Examples of the use of such poppet valve assemblies are in gas compressors where, in larger models, the poppet valve assembly can include a number of separate poppet valves operating in parallel in the same valve assembly The growing necessity for energy conservation, particularly in the area of natural gas reserves, has kindled new interest in developing better ways to transport natural gas and the like more efficiently and at less cost. Generally, gas transmission facilities have relied on reciprocating compressors to move the gas through pipelines connecting the gas reserve to the intended point of use. Many of these compressors utilize poppet valves to provide suction or discharge capability. Inasmuch as these valves may experience up to one thousand closures per minute or more, any deficiency of the valve results in reduced efficiency, excessive wear and possible valve failure.

As is well understood, the poppet element or poppet is a spring-loaded mushroom-shaped pressure actuated seal which reciprocates in coaxial bores in the valve seat and the cage. In conventional valves, the poppet is guided by a stem portion in the valve cage. A spring received in a recess or counterbore in the stem serves to provide a return force for initiating the return of the poppet as well as to provide an opposing force to prevent premature and excessively rapid opening of the valve. Generally, a close fit between the poppet stem and the cage is required to provide dampening action. Such valves have historically experienced manufacturing and maintenance problems, arising from the fact that the poppet head must be accurately positioned with respect to its mating seating surface on the valve seat. Since the poppet is guided in the cage, close tolerances are required to develop the proper mechanical alignment between the seat and cage. For this reason, seats and cages must generally be maintained in matched sets or groups, which complicates routine servicing and can prevent renewal of the seat sealing surface without replacement or rework of the entire valve.

Efficiency has also been reduced in prior art valves by turbulence created by restrictions in the flow path, which leads to non-uniform flow velocities, losses and unnecessarily large pressure drops. For such compressors, it has been found that any turbulence produces resistance impeding the flow of gas leading to increased component wear an unacceptable efficiencies.

SUMMARY OF THE INVENTION

The present invention is directed to a poppet scavenger valve design having multiple cage rails or cage components for multiple poppets, permitting better control of the spacing of the assembly, facilitating maintenance and permitting better fluid flow through the cage structure. The subject invention includes a spacer or lift plate positioned between the cage and the seat for defining a flow control device for accurately setting and controlling the valve flow. A plurality of independent cages house multiple poppets.

In the preferred embodiment of the invention each cage element is mounted on the lift plate and is the fastening element is trapped between the plate and the seat. Alignment pins are provided to assure proper alignment between the seat and the cage. The stroke, or valve flow, can be controlled by adjusting the height of the lift plate, without any alteration to or modification of the cage. Multiple cage configurations are possible with the teaching of the subject invention including cages for supporting any array of poppets from a grid to a longitudinal assembly. Each cage is adapted for supporting any multiple of poppets, including single poppet cage systems where applicable. Each of the plurality of cages in a single valve system may be customized to provide clearance for external components and for other uses, as necessary.

The scavenger valve assembly of the subject invention is easy to maintain, particularly in the sense that the entire poppet array does not need to be disturbed during maintenance and repair since only a defined number of poppets are supported and secured in the valve by each cage element.

It is, therefore, an object and feature of the subject invention to provide a scavenger cage system having multiple cage elements for supporting multiple poppets.

It is another object and feature of the subject invention to provide a means for entrapping a cage fastening system between the valve seat and a lift control assembly.

It is a further object and feature of the subject invention to provide a scavenger valve system with increased flow characteristics.

It is also an object and feature of the subject invention to provide a scavenger valve system with accurate and easily controllable flow management capabilities.

Other objects and features of the subject invention will be readily apparent from the accompanying drawings and detailed description of the preferred embodiments.

DETAILED DESCRIPTION OF THE PREFERRED EMBODIMENTS

Figure 1:
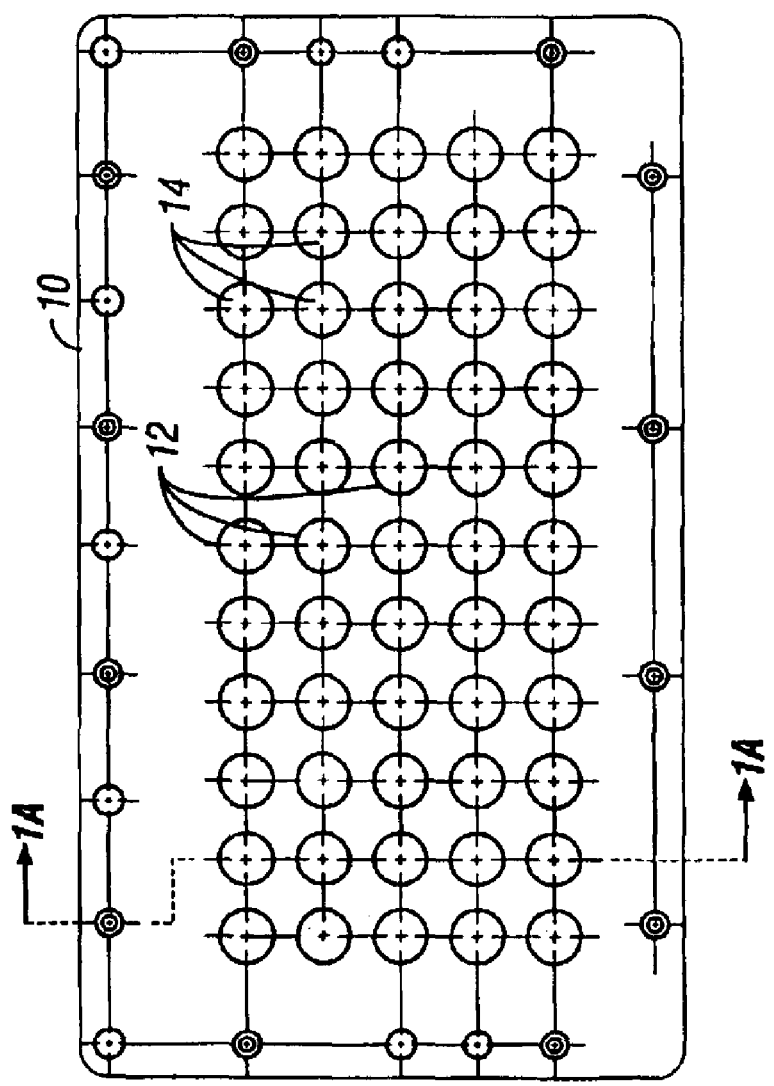
FIG. 1 is a top view of a first scavenger valve assembly in accordance with the subject invention.
Figure 1A:
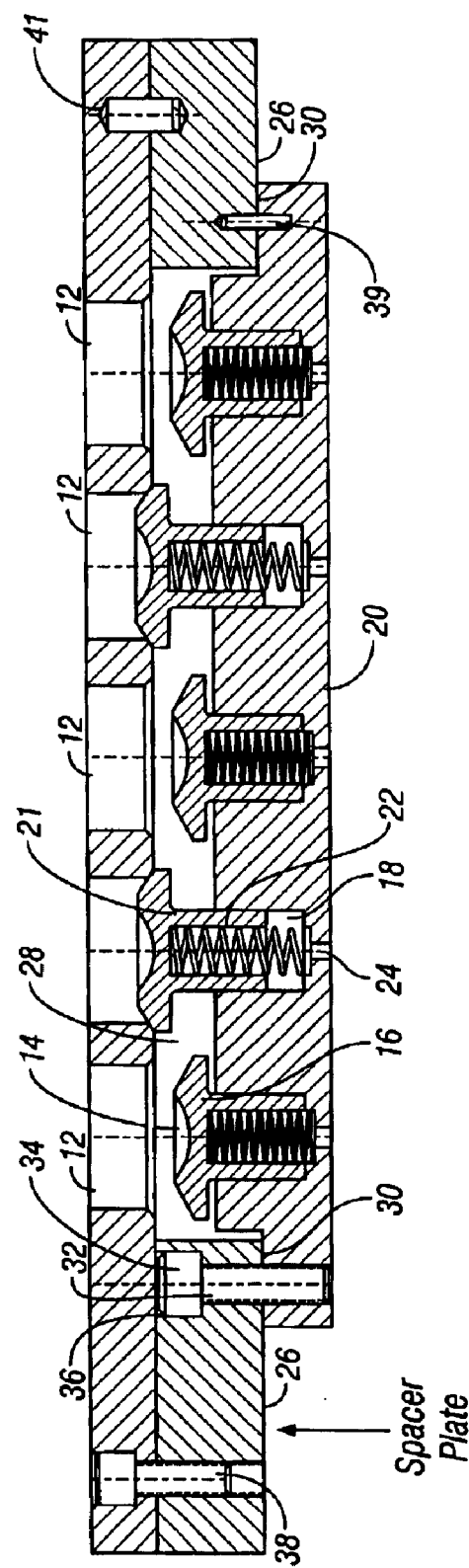
FIG. 1A is a cross-sectional view taken along line A—A of FIG. 1, showing a stepped cage rail.

The top view of a scavenger valve assembly is shown in FIG. 1. Basically, all that is visible in this view is the valve seat plate 10, the plurality of cylinder bores 12 and the tops 14 of the poppets 16 (see FIG. 1A) in alignment with the cylinder bores 12. As better seen in FIG. 1A, each of the poppets 16 is housed in a counter bore 18 provided in a rail-type stop plate, guard or cage 20. As is typical, poppet stem 21 is adapted for housing or guiding a compression spring 24 which normally urges the poppet toward the valve seat 12 for closing the valve against the seat defined by the cylinder bore. In the illustrated embodiment the poppet stem 21 is hollow at 22 for housing the spring 24.

In this embodiment of the invention, a lift or spacer plate 26 is positioned between the seat 10 and the cage 20. The lift plate 26 controls the gap 28 between the cage 20 and the seat 10, and thus controls the flow rate of the valve. The cage may include a step surface 30 for reducing the gap defined by the lift plate.

It is desirable to secure the cage directly to the lift plate by bolts or other fasteners 32, with the head 34 received in the counter bore 36 provided in the lift plate. Thus, when the lift plate is mounted on the seat 10 by bolts or other fasteners 38, the cage is entrapped in assembled relationship with the mounting bolts 32 encased between the seat 10 and the lift plate 26, thereby providing a secure assembly. In one embodiment of the invention the lift plate may be coextensive with the seat plate, with all of the cages secured to a single lift plate. In another embodiment of the invention the lift plate may accommodate a portion of the seat plate and may carry one or more cages, as desired. This will facilitate maintenance by permitting access to a limited number of poppets without disassembling the entire valve. Of course, the invention also may be used in connection with other spacer systems, with each cage having an independent spacer component or acting, itself, as the spacer component. The entrapped fastener assures that the fastener can not be released into the system in the event it becomes free, thus increasing the safety of the assembled system.

The assembly of the invention also includes alignment pins 39 between the lift plate and cage and alignment pins 41 between the lift plate and seat plate, to assure proper alignment during assembly.

Figure 2:
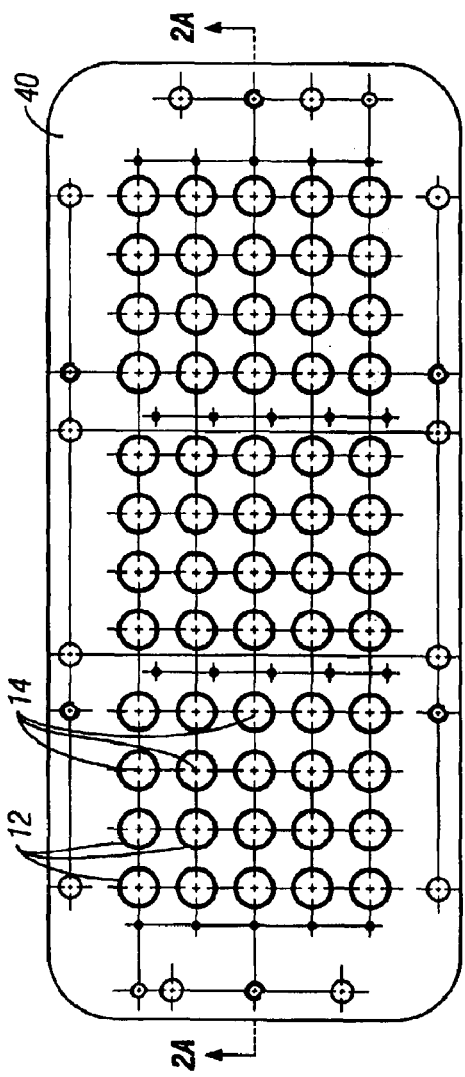
FIG. 2 is a top view of a second scavenger valve assembly in accordance with the subject invention.
Figure 2A:
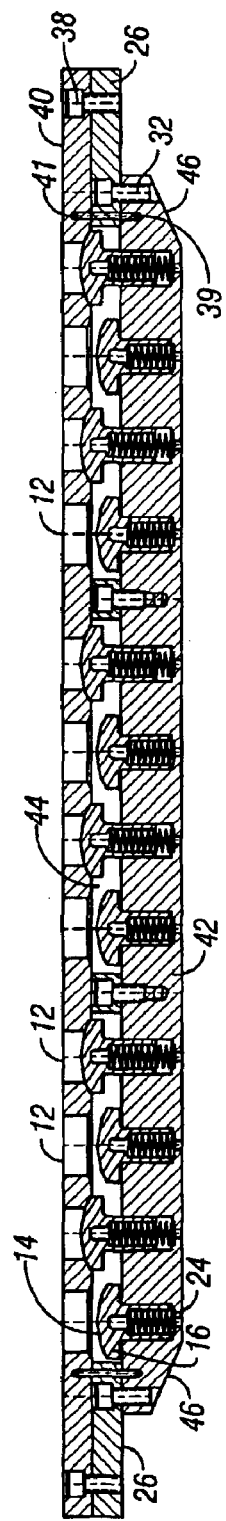
FIG. 2A is a cross-sectional taken along line 2A—2A of FIG. 2, showing a clearance angle cage rail.

FIG. 2 is similar to FIG. 1 and shows a modified seat 40 with cylinder bores 12 and poppets 16 having visible tops 14. In this embodiment and as shown in FIG. 2A, the cage rail 42 is not stepped and the gap 44 defined by the lift plate 26 is equal to the thickness of the lift plate. Clearance surfaces such as angles 46 are provided on the cage plate to provide clearance for external components.

Figure 3:
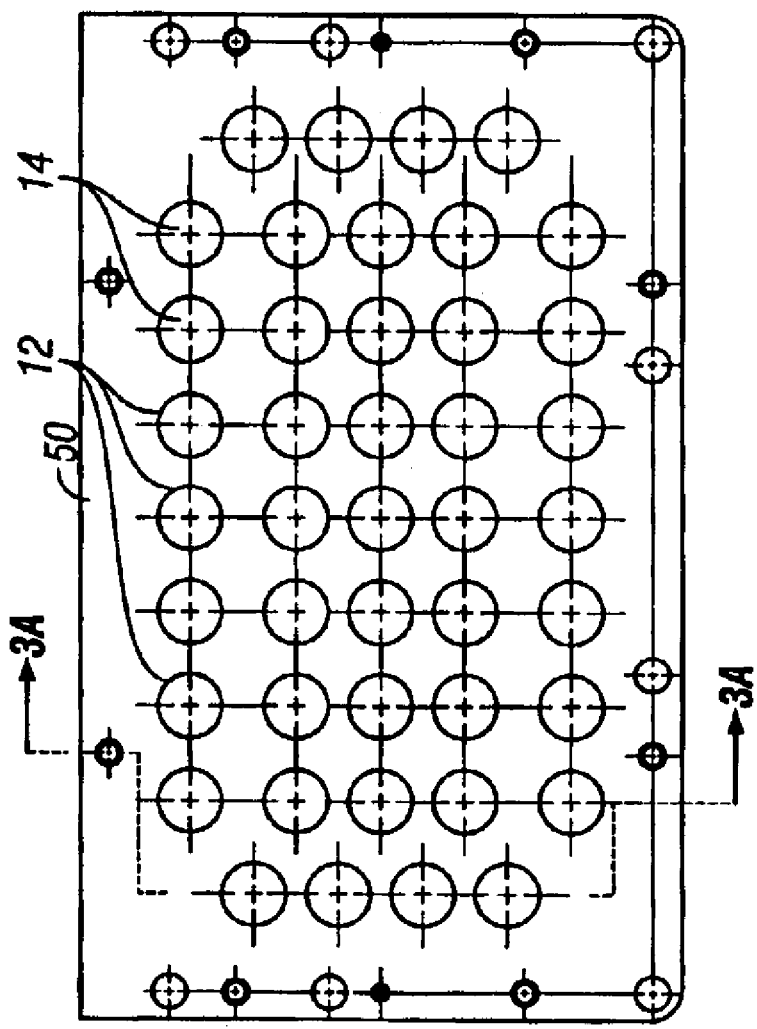
FIG. 3 is a top view of a third scavenger valve assembly in accordance with the subject invention.
Figure 3A:
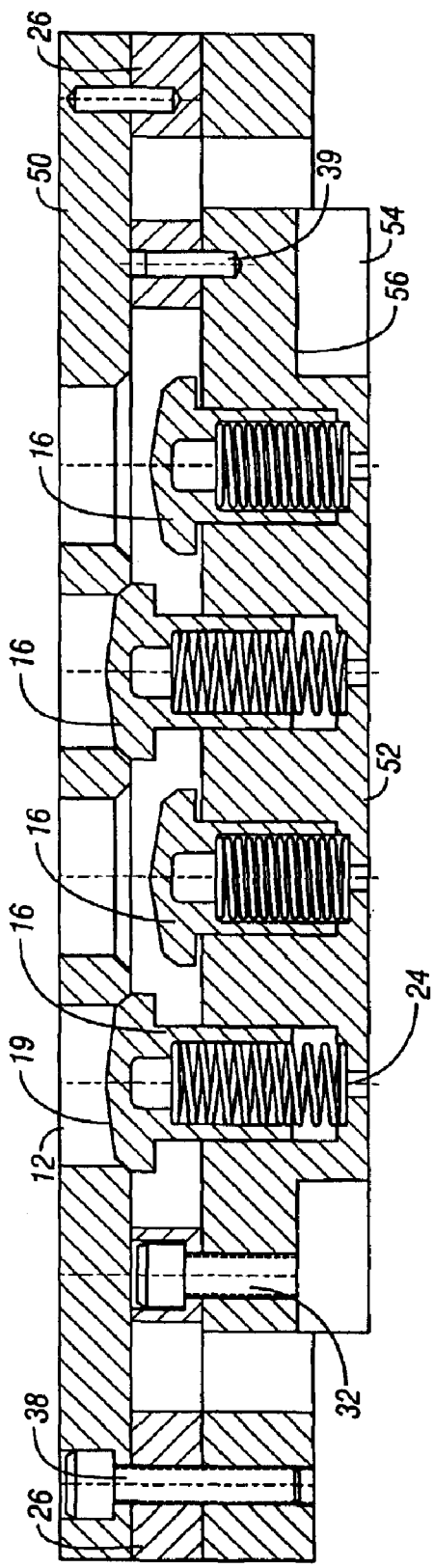
FIG. 3A is a cross-sectional view taken along line 3A—3A of FIG. 3, showing an end cage rail with a clearance step surface.

FIG. 3 is also similar to FIGS. 1 and 2 and shows a modified seat 50 with cylinder bores 12 and poppets 16 having visible tops 14. As can be seen along the cross-sectional line 3A—3A of FIG. 3, only four poppets are housed in the particular cage 52 shown in FIG. 3A. One of the advantages to this system is a plurality of different "standard" cages may be provided and mixed as required to make a variety of different valve configurations. A five poppet mid-cage 54 is partially shown in FIG. 3A. It will also be noted that the end-cage 52 includes a step clearance surface 56.

Figure 4:
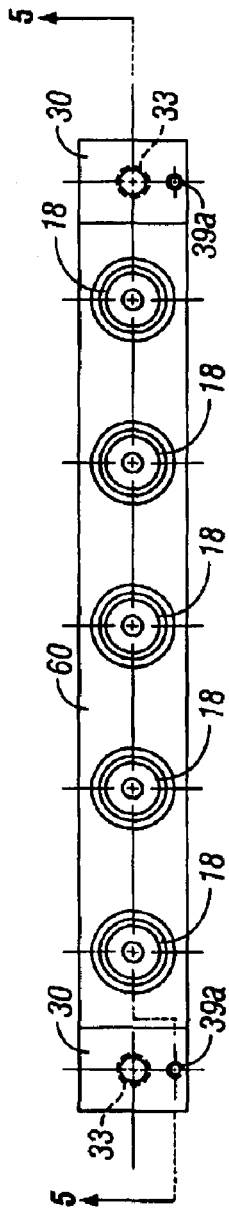
FIG. 4 is a top view of the cage component of the valve assembly of FIG. 2
Figure 5:
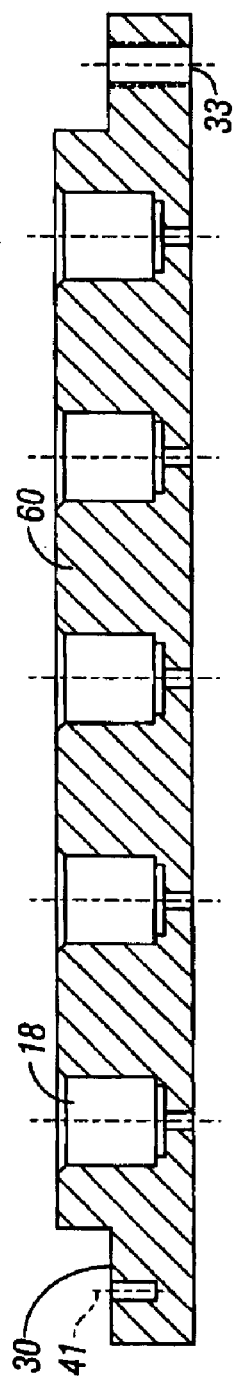
FIG. 5 is a cross-sectional view taken along line 5—5 of FIG. 4.

FIG. 4 is the top view of a five poppet cage 60, and shows the counter bores 18 for housing the poppets, the step gap surfaces 30, the threaded mounting bores 33 and the alignment pin bores 39a. The cross sectional view of this cage is shown in FIG. 5 and corresponds generally to the cage shown in FIGS. 1 and 1A.

Figure 6:
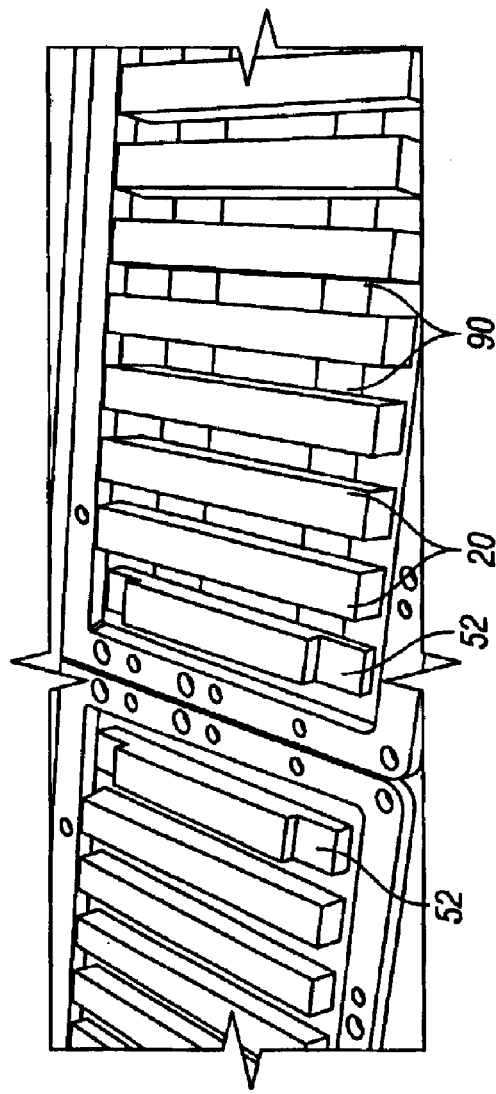
FIG. 6 is a view of an assembled scavenger valve, showing the space between adjacent cage rails for increasing the flow capacity.

As shown in FIG. 6, the assembled valve includes a plurality of cages 20 and 52, each housing a specified number of poppets, five or four as shown. The cages are spaced from one another providing a plurality of gaps 90 and providing good flow area for the valves. As can be seen from the foregoing, the cage and lift plate system of the subject invention provides a versatile assembly with multiple cage configurations, simplified assembly and manufacturing and enhanced flow characteristics.

While certain embodiments and features of the invention have been shown in detail herein it will be recognized that the invention includes all modifications and enhancements within the scope and spirit of the following claims.

What is claimed is:

1. A cage system for a scavenger poppet valve assembly having a plurality of poppets, a valve seat plate and a cage subassembly comprising:
   a. a first cage rail for housing a first portion of the poppets;
   b. a second cage rail for housing a second portion of the poppets;
   c. a spacer between the valve seat plate and each cage rail; and
   d. a fastener system for securing the first and second cage rails and the poppets housed therein to the scavenger poppet valve assembly,
   e. wherein the first and second cage rails are aligned adjacent one another in the same plane and removably attached to said scavenger poppet valve assembly independent of one another.

2. The cage system of claim 1, wherein the fastener system is adapted for mounting the spacer on the valve seat plate.

3. The cage system of claim 1, wherein the spacer is coextensive with the valve seat plate.

4. The cage system of claim 1, wherein the spacer defines the gap between valve seat plate and the cage rails.

5. The cage system of claim 1, wherein the first and second cage rails are dissimilar.

6. The cage system of claim 1, wherein the first and second cage rails are identical.

7. The cage system of claim 1, wherein a cage rail includes a clearance surface for accommodating external components.

8. The cage system of claim 1, further including alignment components on the cage rails, the spacer and the valve seat plate for assuring proper alignment during assembly.

9. A cage system for a scavenger poppet valve assembly having a plurality of poppets, a valve seat plate and a cage subassembly comprising:

a. a first cage rail for housing a first portion of the poppets;

b. a second cage rail for housing a second portion of the poppets;

c. a spacer between the valve seat plate and a cage rail with the spacer attached to the valve seat plate; and d. a fastener system for securing the first and second cage rails and the poppets housed therein to the scavenger poppet valve assembly;

e. wherein the fastener system is adapted for independently attaching a cage rail on the spacer and the spacer to the valve seat plate.

10. The cage system of claim 9, wherein the fastener system for the cage rails is entrapped between the spacer and the valve seat plate when the spacer is mounted on the valve seat plate.

11. The cage system for a scavenger poppet valve assembly having a plurality of poppets, a valve seat plate and a cage subassembly comprising:

a. a first cage rail for housing a first portion of the poppets;

b. a second cage rail for housing a second portion of the poppets;

c. a spacer between the valve seat plate and each cage rail; and d. a fastener system for securing the first and second cage rails and the poppets housed therein to the scavenger poppet valve assembly;

e. a cage rail further including a stepped surface for receiving the spacer, whereby the combination of the stepped surface and the spacer defines a gap between the valve seat plate and the cage rails.

12. A scavenger valve of the type have a valve seat plate with cylindrical bores, poppets mated with each of said bores and a cage system having counter bores for housing said poppets, the cage system mounted on the valve seat plate, the valve comprising:

a. a first cage rail for housing a first portion of the poppets;

b. a second cage rail for housing a second portion of the poppets;

c. a spacer between the valve seat plate and each cage rail; and d. a fastener system for securing the first and second cage rails and the poppets housed therein to the spacer.

13. The cage system of claim 12, wherein the fastener system is adapted for mounting each cage rail on the spacer.

14. The cage system of claim 12, wherein the fastener system is adapted for mounting the spacer on the valve seat plate.

15. The cage system of claim 12, wherein the spacer is coextensive with the valve seat plate.

16. The cage system of claim 12, wherein the spacer defines the gap between valve seat plate and the cage rails.

17. The cage system of claim 12, a cage rail further including a stepped surface for receiving the spacer, whereby the combination of the stepped surface and the spacer defines the gap between the valve seat plate and the cage rails.

18. The cage system of claim 12, wherein the first and second cage rails are dissimilar.

19. The cage system of claim 12, wherein the first and second cage rails are identical.

20. The cage system of claim 12, wherein a cage rail includes a clearance surface for accommodating external components.

21. The cage system of claim 13, wherein the fastener system for the cage rails is entrapped between the spacer and the valve seat plate when the spacer is mounted on the valve seat plate.

22. The cage system of claim 12, further including alignment components on the cage rails, the spacer and the valve seat plate for assuring proper alignment during assembly.

* * * * *